United States Patent
Takikawa et al.

(10) Patent No.: US 10,355,495 B2
(45) Date of Patent: Jul. 16, 2019

(54) NON-CONTACT POWER FEEDING DEVICE

(71) Applicant: FUJI CORPORATION, Chiryu (JP)

(72) Inventors: Shinji Takikawa, Nagoya (JP); Takeshi Nomura, Chiryu (JP)

(73) Assignee: FUJI CORPORATION, Chiryu (JP)

(*) Notice: Subject to any disclaimer, the term of this patent is extended or adjusted under 35 U.S.C. 154(b) by 0 days.

(21) Appl. No.: 15/740,215

(22) PCT Filed: Jun. 29, 2015

(86) PCT No.: PCT/JP2015/068630
§ 371 (c)(1),
(2) Date: Dec. 27, 2017

(87) PCT Pub. No.: WO2017/002154
PCT Pub. Date: Jan. 5, 2017

(65) Prior Publication Data
US 2018/0198287 A1 Jul. 12, 2018

(51) Int. Cl.
*H02J 5/00* (2016.01)
*H02J 50/12* (2016.01)
(Continued)

(52) U.S. Cl.
CPC ............. *H02J 5/005* (2013.01); *H02J 50/12* (2016.02); *H02J 50/80* (2016.02); *H04B 5/0037* (2013.01)

(58) Field of Classification Search
CPC ............. H02J 5/005; H02J 7/025; H02J 17/00; H02N 2/008; H04B 5/0025–0093;
(Continued)

(56) References Cited

U.S. PATENT DOCUMENTS

2016/0303301 A1* 10/2016 Bluvshtein ............ A61M 1/1086

FOREIGN PATENT DOCUMENTS

JP          8-5679       1/1996
JP       2008-017652     1/2008
(Continued)

OTHER PUBLICATIONS

International Search Report dated Sep. 8, 2015, in PCT/JP2015/068630 filed Jun. 29, 2015.

*Primary Examiner* — Rexford N Barnie
*Assistant Examiner* — Thai H Tran
(74) *Attorney, Agent, or Firm* — Oblon, McClelland, Maier & Neustadt, L.L.P.

(57) ABSTRACT

A non-contact power feeding device includes a power receiving element in a power receiving-side device, a power receiving circuit that converts power received by the power receiving element, generates a motive power voltage and outputs to a motive power load, and generates a control voltage and outputs to a control load, a power feeding element that is provided in a power feeding-side device, an power supply that switches between an operational frequency during driving of the motive power load and the control load and a standby frequency during driving of the control load only, and supplies power to the power feeding element, frequency detecting sections that detect a power reception frequency of the power received by the power receiving element, and a motive power shutoff section that shuts off output of the motive power voltage when the power reception frequency changes from the operational frequency to the standby frequency.

6 Claims, 4 Drawing Sheets (51) Int. Cl.
*H02J 50/80* (2016.01)
*H04B 5/00* (2006.01)

(58) Field of Classification Search
CPC .................... B60L 5/005; B60L 11/182; B60L 11/1829–1831; Y02T 90/122; H01F 27/006; H01F 27/02; H01F 38/14; H01F 2038/143–146; H01R 13/6633; A61B 1/00029; A61N 1/3787
USPC .......................................... 307/104; 320/108
See application file for complete search history.

(56) References Cited

FOREIGN PATENT DOCUMENTS

| | | |
|---|---|---|
| JP | 2013-236484 | 11/2013 |
| JP | 5472399 B2 | 4/2014 |
| JP | 5545341 B2 | 7/2014 |

\* cited by examiner

NON-CONTACT POWER FEEDING DEVICE

TECHNICAL FIELD

The present application relates to a non-contact power feeding device that feeds power in a non-contact manner from a power feeding-side device to a power receiving-side device, which has a motive power load and a control load.

BACKGROUND ART

A solder printing machine, a component mounting machine, a reflow machine, and a board inspection machine, and the like, are examples of equipment that produces boards on which multiple components are mounted. Generally, a board production line is configured by linking such equipment. Among such equipment, the component mounting machine is generally provided with a board conveyance device, a component supply device, a component transfer device, and a control device. A feeder device having a system that reels out a tape on which a plurality of electronic component are stored at a predetermined pitch is a representative example of a component supply device. A feeder device is configured to have a flattened shape that is thin in the width direction, and a plurality thereof are linearly arranged on a device table of a component mounting machine. A feeder device has a motive power load such as a motor in a mechanism section that supplies a component, and has a control load such as a microcomputer or a sensor that controls the motive power load.

In the related art, multi-terminal connectors having a contact power feeding system have been used in order to feed power to a feeder device from a main body of a component mounting machine. However, in a multi-terminal connector, there is a concern of deformation, damage, or the like, to the terminals due to the repetition of a removal/insertion manipulation. In recent years, the use of non-contact power feeding devices such as an electromagnetic coupling system, a capacitive coupling system, or the like, has been implemented as a countermeasure. Additionally, the application of non-contact power feeding devices is not limited to feeder devices of component mounting machine, and includes a broad range of fields such as board production facilities, assembling machines that produce other product, processing machines, and the like. In addition, a power receiving-side device, which is fed power in a non-contact manner, having a motive power load and a control load is also an ordinary matter. Technical examples relating to such non-contact power feeding devices are disclosed in PTL 1 and 2.

A wireless power feeding device of PTL 1 is a device that wirelessly supplies power to a power receiving coil from a power feeding coil, the device being characterized in that a resonance frequency is set to an Industry-Science-Medical (ISM) frequency band, and a current is supplied by alternately switching first and second switching transistors. According to such a configuration, it is possible to enhance the electric power transmission efficiency of a magnetic resonance type wireless power feeding, and therefore, it is possible to suppress the number of coils required.

In addition, the wireless power feeding device of PTL 2 is a device that wirelessly supplies power to a power receiving coil from a power feeding coil, the device being characterized by being provided with a resonance circuit that includes a first coil and a capacitor that are connected in series, a power supply control circuit that causes the resonance circuit to resonate by alternately electrically connecting first and second switches, and an effective signal generation circuit that generates an effective signal for setting drive periods and a stop periods of the first and second switches, and the power supply control circuit continuing a resonance state by performing feedback control of the first and second switches in the drive periods. According to such a configuration, a magnetic resonance type wireless power feeding technique in which it is possible to realize a drive system of a power feeding coil by using a simple configuration is constituted.

CITATION LIST

Patent Literature

PTL 1: Japanese Patent No. 5472399
PTL 2: Japanese Patent No. 5545341

SUMMARY

Technical Problem

It should be noted that in general non-contact power feeding devices other than PTL 1 and 2, when operation of a power receiving-side device is temporarily stopped, non-contact power feeding is interrupted, a motive power voltage is lost, and a motive power load is stopped. In this case, a control voltage is also lost, and the control load is also stopped. Therefore, when non-contact power feeding is resumed, a time for the control load to rise, for example, a loading time of a microcomputer is required, and therefore, restart of the power receiving-side device is delayed. Furthermore, information required for control is lost, and there is a concern that it will be difficult to restart the power receiving-side device smoothly. Such problems occur each time non-contact power feeding is interrupted and resumed. Accordingly, it is preferable that at least the control load be continuously driven when operation of the power receiving-side device is temporarily stopped.

The present disclosure has been devised in the light of the above-mentioned problems of the background art, and a problem to be solved thereof is to provide a non-contact power feeding device that is configured to be capable of stopping a motive power load and continuously driving a control load by continuing non-contact power feeding when operation of the power receiving-side device is temporarily stopped, and thereby performing rapid and smooth restart of the power receiving-side device.

Solution to Problem

A non-contact power feeding device of the present disclosure that solves the above-mentioned problems is provided with a power receiving element that is provided in a power receiving-side device, a power receiving circuit that converts AC power received by the power receiving element, generates a motive power voltage and outputs to a motive power load, and generates a control voltage and outputs to a control load, a power feeding element that is provided in a power feeding-side device, which is disposed facing the power receiving-side device, and feeds AC power in a non-contact manner by electrically coupling with the power receiving element, an AC power supply that switches a drive frequency between an operational frequency during driving of the motive power load and the control load and a standby frequency during driving of the control load only, and supplies AC power of the drive frequency to the power feeding element, a frequency detecting section that detects a power reception frequency of the AC power received by the power receiving element, and a motive power shutoff section that shuts off output of the motive power voltage when the power reception frequency is outside a predetermined frequency range that includes the operational frequency or when the power reception frequency is inside a predetermined frequency range that includes the standby frequency.

Advantageous Effects

In the non-contact power feeding device of the present disclosure, the drive frequency of an AC power supply of the power feeding-side device is switched between the operational frequency and the standby frequency, and a frequency detecting section and a motive power shutoff section are provided in the power receiving-side device. Therefore, the non-contact power feeding device performs non-contact power feeding using the operational frequency at normal times, and switches the drive frequency to the standby frequency by using the power feeding-side device when operation of the power receiving-side device is temporarily stopped. Considering this, in the power receiving-side device, it is possible to detect switching of the frequency, shut off output of the motive power voltage and stop the motive power load, and it is also possible to continuously drive the control load by using non-contact power feeding using the standby frequency. Further, when the power receiving-side device is restarted, if the drive frequency is returned to the operational frequency by using the power feeding-side device, the motive power voltage is restored in the power receiving-side device. Moreover, time for the control load to rise is not required, and there is not a concern that information required in control will be lost. Accordingly, restart of the power receiving-side device can be performed rapidly and smoothly.

DESCRIPTION OF EMBODIMENTS (1. Configuration of Non-Contact Power Feeding Device 1 of First Embodiment)

Figure 1:
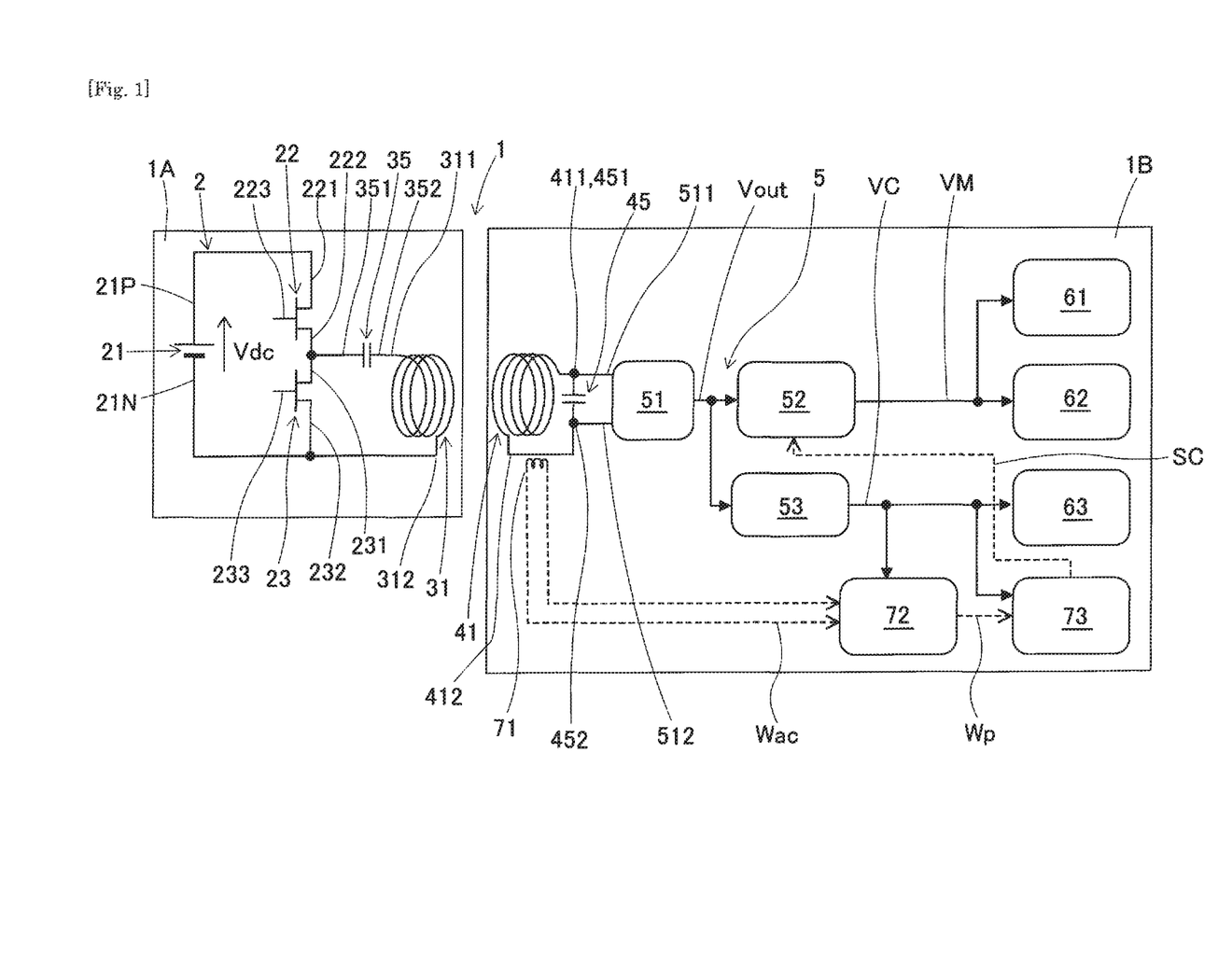
FIG. 1 is a block diagram that shows a configuration of a non-contact power feeding device of a first embodiment of the present disclosure, and shows a partial circuit configuration.
Figure 2:
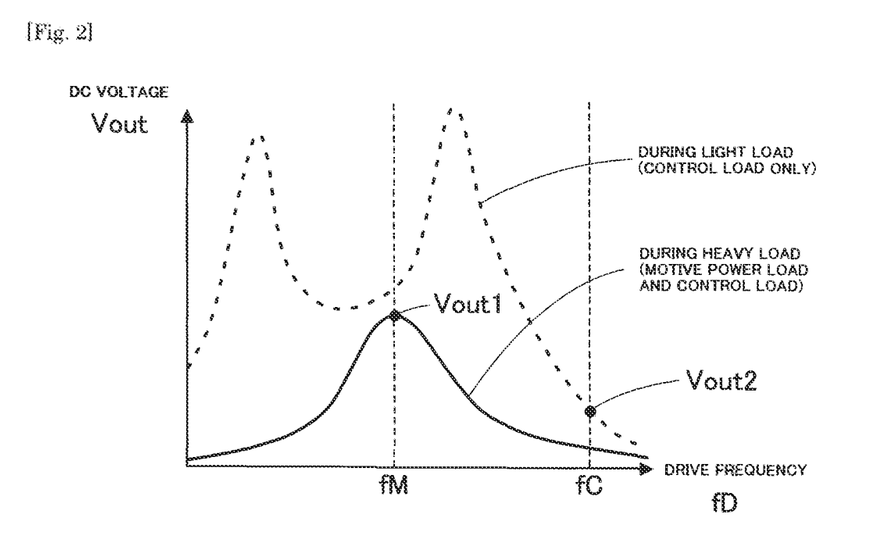
FIG. 2 is a view that shows frequency properties of non-contact power feeding performance of the non-contact power feeding device.

A non-contact power feeding device 1 of a first embodiment of the present disclosure will be described below with reference to FIGS. 1 to 3. FIG. 1 is a block diagram that shows a configuration of the non-contact power feeding device 1 of the first embodiment of the present disclosure, and shows a partial circuit configuration. The non-contact power feeding device 1 feeds AC power in a non-contact manner from a power feeding-side device 1A to a power receiving-side device 1B. As shown in FIG. 1, the power feeding-side device 1A and the power receiving-side device 1B are used in a manner in which the two are disposed facing one another. The positional relationship between the power feeding-side device 1A and the power receiving-side device 1B may be capable of relative displacement, or not capable of relative displacement. The non-contact power feeding device 1 is provided with an AC power supply 2, a power feeding coil 31, and a power feeding-side capacitor 35 in the power feeding-side device 1A. The non-contact power feeding device 1 is further provided with a power receiving coil 41, a power receiving-side capacitor 45, a power receiving circuit 5, a pulse conversion circuit 72, and a control device 73 in the power receiving-side device 1B.

The AC power supply 2 of the power feeding-side device 1A is configured by a DC power supply section 21, a positive side switching element 22, a negative side switching element 23, a frequency control section, which is not illustrated in the drawings, and the like. The DC power supply section 21 outputs a power supply voltage Vdc. The positive side switching element 22 and the negative side switching element 23 configure a half bridge circuit, convert the power supply voltage Vdc to AC power and output the AC power. The frequency control section controls the drive frequency fD of the AC power.

A high-voltage terminal 21P of the DC power supply section 21 is connected to a high-voltage terminal 221 of the positive side switching element 22. A low-voltage terminal 222 of the positive side switching element 22 is connected to a high-voltage terminal 231 of the negative side switching element 23 and one end 351 of the power feeding-side capacitor 35. A low-voltage terminal 232 of the negative side switching element 23 is connected to a low-voltage terminal 21N of the DC power supply section 21.

The frequency control section alternately outputs a control signal to a control terminal 223 of the positive side switching element 22 and a control terminal 233 of the negative side switching element 23. As a result of this, AC power is output due to the action of the half bridge circuit. Furthermore, the frequency control section switches the drive frequency fD of the AC power between an operational frequency fM and a standby frequency fC by controlling a delivery interval of the control signal. The operational frequency fM is a frequency for driving a motive power load and a control load at normal times during which the power receiving-side device 1B is activated. The standby frequency fC is a frequency for driving the control load when standing by due to operation of the power receiving-side device 1B being temporarily stopped.

The operational frequency fM is defined as a resonance frequency during a heavy load of a resonance circuit that is formed by the power feeding coil 31, the power feeding-side capacitor 35, the power receiving coil 41, the power receiving-side capacitor 45, and the like (mentioned in more detail later). The operational frequency fM and the standby frequency fC are preferably of an extent of a few tens of kHz to a few hundreds of kHz, but need not necessarily be limited to this frequency range.

The other end 352 of the power feeding-side capacitor 35 is connected to one end 311 of the power feeding coil 31. The power feeding coil 31 is one form of a power feeding element. The power feeding-side capacitor 35 is a resonance element that is connected in series to the power feeding coil 31 and forms a resonance circuit. The other end 312 of the power feeding coil 31 is connected to the low-voltage terminal 232 of the negative side switching element 23. As a result of this, a closed power feeding circuit of the power feeding-side device 1A is configured.

The power receiving coil 41 of the power receiving-side device 1B is disposed facing the power feeding coil 31 of the power feeding-side device 1A. The power receiving coil 41 and the power feeding coil 31 electromagnetically couple with one another, mutual inductance is generated, and non-contact power feeding becomes possible. The power receiving coil 41 is one form of a power receiving element. One end 411 of the power receiving coil 41 is connected to one end 451 of the power receiving-side capacitor 45 and one end 511 of a rectifier circuit 51 that configures the power receiving circuit 5. The other end 412 of the power receiving coil 41 is connected to the other end 452 of the power receiving-side capacitor 45 and the other end 512 of the rectifier circuit 51. The power receiving-side capacitor 45 is a resonance element that is connected in parallel to the power receiving coil 41 and forms a resonance circuit.

The power receiving circuit 5 is configured to include the rectifier circuit 51, a motive power-side power supply circuit 52, and a control-side power supply circuit 53. The rectifier circuit 51 rectifies the AC power received by the power receiving coil 41 by non-contact power feeding, converts the AC power to a DC voltage Vout, and outputs the DC voltage Vout to the motive power-side power supply circuit 52 and the control-side power supply circuit 53. A full-wave rectifier circuit in which four rectifier diodes are bridge connected can be included as an illustrative example of the rectifier circuit 51.

The motive power-side power supply circuit 52 converts the DC voltage Vout to a motive power voltage VM and outputs the motive power voltage VM to the motive power load. FIG. 1 illustrates a motor 61 and an amplifier 62 as an example of a motive power load. A direct current of 48 V is an illustrative example of the motive power voltage VM. The control-side power supply circuit 53 converts the DC voltage Vout to a control voltage VC and outputs the control voltage VC to the control load. FIG. 1 illustrates sensors 63 as an example of a control load. The pulse conversion circuit 72 and the control device 73 correspond to the control load. A direct current of 24 V or a direct current of 5 V, which are lower than the motive power voltage VM are illustrative examples of the control voltage VC. In addition, a switching system or dropper system DC-DC converter is an illustrative example of the motive power-side power supply circuit 52 and the control-side power supply circuit 53.

A frequency detection transformer 71 is electrically coupled to a line that connects the other end 412 of the power receiving coil 41 and the other end 452 of the power receiving-side capacitor 45. The frequency detection transformer 71 transforms the waveform of the AC power received by the power receiving coil 41 in an AC detection waveform Wac, and outputs to the pulse conversion circuit 72. The pulse conversion circuit 72 has comparator. The comparator outputs a high level in time slots in which the AC detection waveform Wac is equal to a predetermined voltage or more, and outputs a low level in time slots in which the AC detection waveform is less than the predetermined voltage. As a result of this, the pulse conversion circuit 72 outputs a pulse waveform Wp composed of two values of high and low to the control device 73.

The control device 73 is an electronic control system device that has a CPU and operates by using software. The control device 73 counts the number of pulses N of the pulse waveform Wp and detects the power reception frequency fR. Accordingly, the frequency detection transformer 71, the pulse conversion circuit 72, and the control device 73 carry out the function of the frequency detecting section of the present disclosure. In addition, the control device 73 outputs a motive power control signal SC and controls operation and stopping of the motive power-side power supply circuit 52. Accordingly, the control device 73 carries out a function of the motive power shutoff section of the present disclosure. The detailed functions of the control device 73 will be mentioned later together with the operations of the non-contact power feeding device 1.

Next, the frequency properties of the non-contact power feeding device 1 will be described. FIG. 2 is a view that shows frequency properties of non-contact power feeding performance of the non-contact power feeding device 1. The horizontal axis of FIG. 2 represents the drive frequency fD of the AC power supply 2, and the vertical axis represents the DC voltage Vout output from the rectifier circuit 51. In addition, the solid line represents frequency properties during a heavy load of driving the motive power load and the control load, and the broken line represents frequency properties during a light load of driving the control load only.

According to the frequency properties during the heavy load, the resonance frequency of the resonance circuit shown by the peak in the waveform matches the operational frequency fM. Accordingly, a maximum DC voltage Vout1 is obtained when the drive frequency fD is made to match the operational frequency fM. While the DC voltage Vout1 is being input to the motive power-side power supply circuit 52 and the control-side power supply circuit 53, the motive power voltage VM and the control voltage VC are generated, and the motive power load and the control load are driven.

In this instance, the power supply voltage Vdc of the DC power supply section 21 is adjusted so that the DC voltage Vout1 is slightly higher than the motive drive voltage VM. As a result of this adjustment, the circuit configuration of the motive power-side power supply circuit 52 is simplified, and favorable power supply efficiency is obtained. If a configuration in which the DC voltage Vout1 can become lower than the motive drive voltage VM is used, it is necessary to provide the motive power-side power supply circuit 52 with a boosting function and the circuit configuration is more complex. In addition, generally, high power supply efficiency is obtained when a voltage difference between the DC voltage Vout1 on the input side of the motive power-side power supply circuit 52 and the motive drive voltage VM on the output side thereof is small. The power supply efficiency of the motive power-side power supply circuit 52 decreases if the DC voltage Vout1 is considerably higher than the motive drive voltage VM.

Meanwhile, according to the frequency properties during the light load, the resonance frequency of the resonance circuit shown by the peaks in the waveform is generated in two locations above and below the operational frequency fM. Further, the standby frequency fC is set further on the upper side than the resonance frequency on the upper side of the operational frequency fM. A DC voltage Vout2 is obtained when the drive frequency fD is made to match the standby frequency fC. While the DC voltage Vout2 is being input to the control-side power supply circuit 53, the control voltage VC is generated, and the control load is driven. However, even if the DC voltage Vout2 is input to the motive power-side power supply circuit 52, generation of the motive power voltage VM is not guaranteed.

(2. Operations and Actions of Non-Contact Power Feeding Device 1 of First Embodiment)

Next, the operations and actions of the non-contact power feeding device 1 of the first embodiment will be described. In the above-mentioned manner, the frequency control section of the AC power supply 2 controls the drive frequency fD to the operational frequency fM at normal times when the power receiving-side device 1B is activated. In addition, there are cases in which operation of the power receiving-side device 1B is temporarily stopped to ensure safety and for other reasons when an operator accesses the power receiving-side device 1B. In this case, the frequency control section of the AC power supply 2 controls the drive frequency fD to switch to the standby frequency fC. Meanwhile, the control device 73 of the power receiving-side device 1B performs the control that is shown in FIG. 3.

Figure 3:
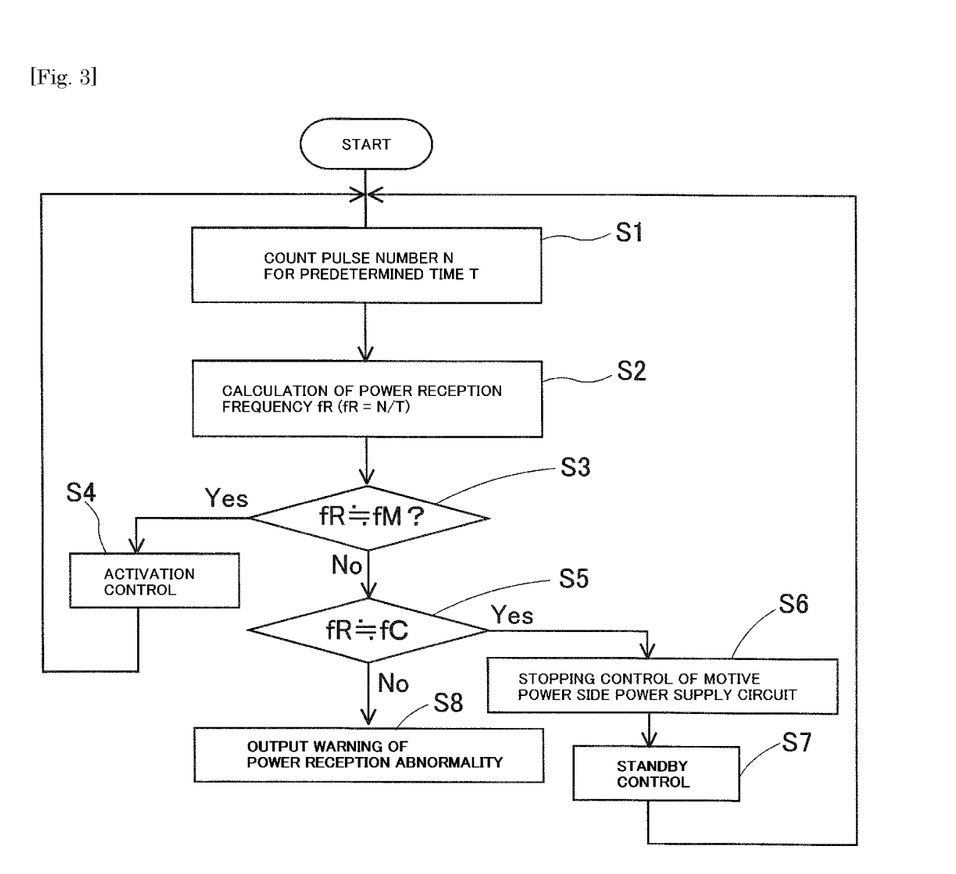
FIG. 3 is a view that shows a control flow of a control device of a power receiving-side device.

FIG. 3 is a view that shows a control flow of the control device 73 of the power receiving-side device 1B. In Step S1 of FIG. 3, the control device 73 counts, for a predetermined time T, the number of pulses N of the pulse waveform Wp input from the pulse conversion circuit 72. In the subsequent Step S2, the control device 73 divides the obtained number of pulses N by the predetermined time T and calculates the power reception frequency fR. In the subsequent Step S3, the control device 73 determines whether or not the power reception frequency fR substantially matches the operational frequency fM. In other words, the control device 73 determines whether or not the power reception frequency fR is inside a predetermined frequency range that includes the operational frequency fM. The control device 73 advances the execution of the control flow to Step S4 when the power reception frequency fR substantially matches the operational frequency fM, and advances the execution of the control flow to Step S5 when this is not the case.

The maximum DC voltage Vout1 is obtained in the state of Step S4. At this time, if the motive power-side power supply circuit 52 is stopped, the control device 73 outputs the motive power control signal SC and operates the motive power-side power supply circuit 52. Accordingly, the control device 73 controls the operation of the motive power load such as the motor 61 and the amplifier 62, or the like, and it is possible to activate the power receiving-side device 1B. Thereafter, one cycle of the control flow ends after a defined period of time elapses and the control device 73 returns the execution of the control flow to Step S1.

In Step S5, the control device 73 determines whether or not the power reception frequency fR substantially matches the standby frequency fC. In other words, the control device 73 determines whether or not the power reception frequency fR is inside a predetermined frequency range that includes the standby frequency fC. The control device 73 advances the execution of the control flow to Step S6 when the power reception frequency fR substantially matches the standby frequency fC, and advances the execution of the control flow to Step S8 when this is not the case.

The DC voltage Vout2 is obtained in the state of Step S6. Accordingly, the control device 73 is continuously activated and controls the motive power-side power supply circuit 52 to stop by using the motive power control signal SC. As a result of this, the motive power voltage VM is no longer generated, and the motive power load is stopped. In Step S7, the control device 73 maintains a standby state of the power receiving-side device 1B and prepares for restart. Thereafter, one cycle of the control flow ends after a defined period of time elapses and the control device 73 returns the execution of the control flow to Step S1.

In Step S8, the power reception frequency fR does not match the operational frequency fM or the standby frequency fC. Accordingly, the control device 73 determines that there is a power reception abnormality and outputs a warning. In other words, the control device 73 has a function of the power reception monitoring section of the present disclosure. In this instance, the frequency control section of the AC power supply 2 generally has a frequency difference that is caused by a temperature dependency property, age-based property changes, or the like. Accordingly, it is preferable to determine that the power reception frequency fR matches the operational frequency fM and the standby frequency fC in each steps S3 and S5, with the predetermined frequency ranges that are set to be slightly greater than the frequency difference.

According to the above-mentioned control flow, when operation of the power receiving-side device 1B is temporarily stopped, the control load is continuously driven by non-contact power feeding using the standby frequency fC. Accordingly, it is possible for the control device 73 to maintain a standby state, and there is not a concern that information required for control will be lost. Further, when the drive frequency fD is returns to the operational frequency fM, the motive power voltage VM is restored in the power receiving-side device 1B. In addition, the control device 73 can start control of the operations of the motive power load immediately from the standby state.

(3. Aspects and Effects of Non-Contact Power Feeding Device 1 of First Embodiment)

The non-contact power feeding device 1 of the first embodiment is provided with the power receiving coil 41 that is provided in the power receiving-side device 1B, the power receiving circuit 5 that converts AC power received by the power receiving coil 41, generates the motive power voltage VM and outputs to the motive power load (the motor 61 and the amplifier 62), and generates the control voltage VC and outputs to the control load (the sensors 63, the pulse conversion circuit 72, and the control device 73), the power feeding coil 31 that is provided in the power feeding-side device 1A, which is disposed facing the power receiving-side device 1B, and feeds AC power in a non-contact manner by electrically coupling with the power receiving coil 41, the AC power supply 2 that switches the drive frequency fD between the operational frequency fM during driving of the motive power load and the control load and a standby frequency fM during driving of the control load only, and supplies AC power of the drive frequency fD to the power feeding coil 31, a frequency detecting section (the frequency detection transformer 71, the pulse conversion circuit 72, and the control device 73) that detects the power reception frequency fR of the AC power received by the power receiving coil 41, and a motive power shutoff section (the control device 73) that shuts off output of the motive power voltage VM when the power reception frequency fR is outside a predetermined frequency range that includes the operational frequency fM or when the power reception frequency fR is inside a predetermined frequency range that includes the standby frequency fC.

According to this configuration, the non-contact power feeding device 1 performs non-contact power feeding using the operational frequency fM at normal times, and switches the drive frequency fD to the standby frequency fC by using the power feeding-side device 1A when operation of the power receiving-side device 1B is temporarily stopped. Considering this, in the power receiving-side device 1B, it is possible to detect switching of the frequency, shut off output of the motive power voltage VM and stop the motive power load, and it is also possible to continuously drive the control load by using non-contact power feeding using the standby frequency fC. Further, when the power receiving-side device is restarted, if the drive frequency fD is returned to the operational frequency fM by using the power feeding-side device 1A, the motive power voltage VM is restored in the power receiving-side device 1B. In addition, time for the control load to rise is not required, and there is not a concern that information required in control will be lost. Accordingly, restart of the power receiving-side device 1B can be performed rapidly and smoothly.

Furthermore, the non-contact power feeding device further includes a resonance element (the power receiving-side capacitor 45 and the power feeding-side capacitor 35) that is connected to at least one of the power receiving coil 41 and the power feeding coil 31 and forms a resonance circuit, and the operational frequency fM matches the resonance frequency of the resonance circuit during a heavy load. According to this configuration, the maximum DC voltage Vout1 is obtained during a heavy load and the power feeding efficiency of non-contact power feeding is enhanced.

Furthermore, the control load is driven and a standby state of the power receiving-side device 1B is maintained when the power reception frequency fR is inside the predetermined frequency range that includes the standby frequency fC. According to this configuration, when the drive frequency fD is returned to the operational frequency fM and non-contact power feeding is resumed, the control device 73 can start control of the operations of the motive power load immediately from the standby state. Accordingly, the effect of being capable of performing restart of the power receiving-side device 1B rapidly and smoothly is considerable and can be reliably obtained.

Furthermore, the non-contact power feeding device further includes a power reception monitoring section (the control device 73) that determines that there is a power reception abnormality when the power reception frequency fR is not inside the predetermined frequency range that includes the operational frequency fM or the predetermined frequency range that includes the standby frequency fC. According to this configuration, a monitoring function related to non-contact power feeding is provided, and therefore, reliability is improved.

Furthermore, the power receiving circuit 5 includes the rectifier circuit 51 that converts the AC power received by the power receiving coil 41 into the DC voltage Vout, the motive power-side power supply circuit 52 that converts the DC voltage Vout into the motive power voltage VM, and the control-side power supply circuit 53 that converts the DC voltage Vout into the control voltage VC, the frequency detecting section includes the pulse conversion circuit 72 that is driven by the control voltage VC and converts the waveform (the AC detection waveform Wac) of the AC power received by the power receiving coil 41 into the pulse waveform Wp, and the control device 73 that is driven by the control voltage VC, counts the number of pulses N of the pulse waveform Wp, and detects the power reception frequency fR, and the control device 73 also serves as the motive power shutoff section that controls the motive power-side power supply circuit 52 to stop on the basis of the detected power reception frequency fR. According to this configuration, it is possible to realize the frequency detecting section and the motive power shutoff section of the present disclosure by using a simple circuit configuration.

Moreover, it is possible to reduce electrical loss that is generated in the power receiving-side device 1B when operation of the power receiving-side device 1B is temporarily stopped and the standby state is used. The first reason for this is that loss caused by the motive power-side power supply circuit 52 being stopped is no longer generated. If the control device 73 only controls the operation of the motive power load to stop, loss of the motive power-side power supply circuit 52 is not prevented. The second reason for this is that in the control-side power supply circuit 53, the DC voltage Vout1 on the input side is reduced to the DC voltage Vout2 and approaches the control voltage VC on the output side, and therefore, power supply efficiency is enhanced.

(4. Non-Contact Power Feeding Device 10 of Second Embodiment)

Figure 4:
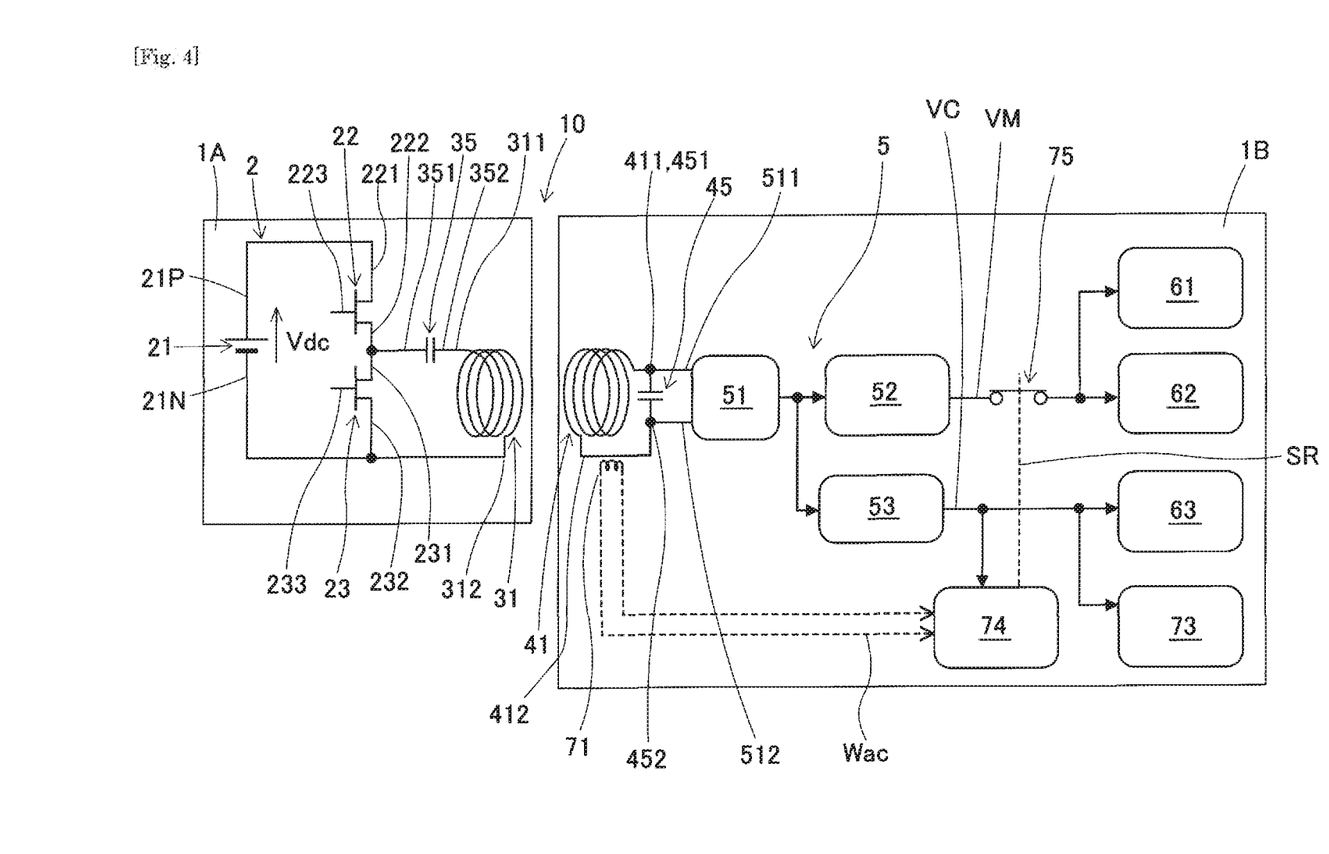
FIG. 4 is a block diagram that shows a configuration of a non-contact power feeding device of a second embodiment, and shows a partial circuit configuration.

Next, a non-contact power feeding device 10 of a second embodiment of the present disclosure will be described focusing on the differences from the first embodiment. FIG. 4 is a block diagram that shows a configuration of the non-contact power feeding device 10 of the second embodiment, and shows a partial circuit configuration. In the second embodiment, the configurations of the frequency detecting section and the motive power shutoff section are different from the first embodiment and the other portions are similar to those of the first embodiment.

In the second embodiment, the frequency detecting section is configured by the frequency detection transformer 71 and a relay control circuit 74. The frequency detection transformer 71 transforms the voltage waveform of the AC power received by the power receiving coil 41 into the AC detection waveform Wac, and outputs the AC detection waveform Wac to the relay control circuit 74. The relay control circuit 74 is driven by the control voltage VC and detects the power reception frequency fR of the AC detection waveform Wac. Furthermore, the relay control circuit 74 outputs a shutoff instruction SR to an electromagnetic opening/closing relay 75 when the power reception frequency fR is outside the predetermined frequency range that includes the operational frequency fM or when the power reception frequency fR is inside the predetermined frequency range that includes the standby frequency fC.

In the second embodiment, the electromagnetic opening/closing relay 75 is used in the motive power shutoff section. The electromagnetic opening/closing relay 75 is connected in series between the output side of the motive power-side power supply circuit 52 and the motive power load. However, the configuration is not limited to this, and the electromagnetic opening/closing relay 75 may be connected in series to the input side of the motive power-side power supply circuit 52. The electromagnetic opening/closing relay 75 is normally closed and is opened and interrupted by the shutoff instruction SR.

In the non-contact power feeding device 10 of the second embodiment, the power receiving circuit 5 includes the rectifier circuit 51 that converts the AC power received by the power receiving coil 41 into the DC voltage Vout, the motive power-side power supply circuit 52 that converts the DC voltage Vout into the motive power voltage VM, and the control-side power supply circuit 53 that converts the DC voltage Vout into the control voltage VC, the frequency detecting section is the relay control circuit 74 that outputs the shutoff instruction when the power reception frequency fR is outside the predetermined frequency range that includes the operational frequency fM or when the power reception frequency fR is inside the predetermined frequency range that includes the standby frequency fC, and the motive power shutoff section is the electromagnetic opening/closing relay 75 that is connected in series to the input side or the output side of the motive power-side power supply circuit 52 and is shut off by the shutoff instruction SR.

The actions and effects of the non-contact power feeding device 10 of the second embodiment are similar to those of the first embodiment, and therefore, description thereof has been omitted.

(5. Application and Modification of Embodiments)

Additionally, the system of the non-contact power feeding is not limited to an electromagnetic coupling system that uses the power feeding coil 31 and the power receiving coil 41, and for example, a capacitive coupling system that uses a power feeding electrode and a power receiving electrode may also be used. In addition, in the first embodiment, the control device 73 may be provided to also serve a function of a control section that controls the operations of the motor 61 and the amplifier 62. Furthermore, in the second embodiment, it is also possible to provide the relay control circuit 74 with a function of a power reception monitoring section. Various other applications and modifications are also possible in the present disclosure.

INDUSTRIAL APPLICABILITY

The non-contact power feeding device of the present disclosure can be used in assembling machines, processing machines, and the like, in various fields that perform the assembly, processing, and the like, of products.

REFERENCE SIGNS LIST 1, 10: non-contact power feeding device, 1A: power feeding-side device, 1B: power receiving-side device, 2: AC power supply, 31: power feeding coil, 35: power feeding-side capacitor, 41: power receiving-side coil, 45: power receiving-side capacitor, 5: power receiving circuit, 51: rectifier circuit, 52: motive power-side power supply circuit, 53: control-side power supply circuit, 61: motor (motive power load), 62: amplifier (motive power load), 63: sensors (control load), 72: pulse conversion circuit, 73: control device, 74: relay control circuit, 75: electromagnetic opening/closing relay, VM: motive power voltage, VC: control voltage, Vout: DC voltage, fM: operational frequency, fC: standby frequency

The invention claimed is:

1. A non-contact power feeding device comprising:
   a power receiving element that is provided in a power receiving-side device;
   a power receiving circuit that converts AC power received by the power receiving element, generates a motive power voltage and outputs to a motive power load, and generates a control voltage and outputs to a control load;
   a power feeding element that is provided in a power feeding-side device, which is disposed facing the power receiving-side device, and feeds AC power in a non-contact manner by electrically coupling with the power receiving element;
   an AC power supply that switches a drive frequency between an operational frequency during driving of the motive power load and the control load and a standby frequency during driving of the control load only, and supplies AC power of the drive frequency to the power feeding element;
   a frequency detecting section that detects a power reception frequency of the AC power received by the power receiving element; and
   a motive power shutoff section that shuts off output of the motive power voltage when the power reception frequency is outside a predetermined frequency range that includes the operational frequency or when the power reception frequency is inside a predetermined frequency range that includes the standby frequency.

2. The non-contact power feeding device according to claim 1, further comprising:
   a resonance element that is connected to at least one of the power receiving element and the power feeding element and forms a resonance circuit,
   wherein the operational frequency matches a resonance frequency of the resonance circuit.

3. The non-contact power feeding device according to claim 1,
   wherein the control load is driven and a standby state of the power receiving-side device is maintained when the power reception frequency is inside the predetermined frequency range that includes the standby frequency.

4. The non-contact power feeding device according to claim 1, further comprising:
   a power reception monitoring section that determines that there is a power reception abnormality when the power reception frequency is not inside the predetermined frequency range that includes the operational frequency or, the predetermined frequency range that includes the standby frequency.

5. The non-contact power feeding device according to claim 1,
   wherein the power receiving circuit includes a rectifier circuit that converts the AC power received by the power receiving element, into a DC voltage, a motive power-side power supply circuit that converts the DC voltage into the motive power voltage, and a control-side power supply circuit that converts the DC voltage into the control voltage,
   the frequency detecting section includes a pulse conversion circuit that is driven by the control voltage and converts a waveform of the AC power received by the power receiving element into a pulse waveform, and a control device that is driven by the control voltage, counts the number of pulses of the pulse waveform, and detects the power reception frequency, and
   the control device also serves as the motive power shutoff section that controls the motive power-side power supply circuit to stop on the basis of the detected power reception frequency.

6. The non-contact power feeding device according to claim 1,
   wherein the power receiving circuit includes a rectifier circuit that converts the AC power received by the power receiving element into a DC voltage, a motive power-side power supply circuit that converts the DC voltage into the motive power voltage, and a control-side power supply circuit that converts the DC voltage into the control voltage,
   the frequency detecting section is a relay control circuit that outputs a shutoff instruction when the power reception frequency is outside the predetermined frequency range that includes the operational frequency or when the power reception frequency is inside the predetermined frequency range that includes the standby frequency, and
   the motive power shutoff section is an opening/closing relay that is connected in series to an input side or an output side of the motive power-side power supply circuit and is shut off by the shutoff instruction.

* * * * *